United States Patent

[11] 3,631,396

| [72] | Inventors | Eugene D. Spertus<br>Barrington;<br>Harry A. Spertus, Barrington Hills; Philip<br>Spertus, Glencoe, all of Ill. |
|---|---|---|
| [21] | Appl. No. | 830,349 |
| [22] | Filed | June 4, 1969 |
| [45] | Patented | Dec. 28, 1971 |
| [73] | Assignee | Hypertech Corporation<br>Harwood Heights, Ill. |

[54] DATA VERIFICATION METHOD AND SYSTEM
13 Claims, 7 Drawing Figs.

[52] U.S. Cl. .................................................. 340/149,
178/7.84, 340/146.1, 356/166
[51] Int. Cl. ........................................... G06f 11/00,
G08c 25/00
[50] Field of Search ........................................... 340/149,
146.3, 146.1; 178/7.83, 7.84, 7.85, 6.8; 356/164,
165, 166

[56] References Cited
UNITED STATES PATENTS

| 2,526,682 | 10/1950 | Mulberger et al. | 178/7.83 |
| 2,586,743 | 2/1952 | Thresher et al. | 178/7.83 |
| 3,090,043 | 5/1963 | Wilkenson | 356/165 |
| 3,167,746 | 1/1965 | Reines et al. | 340/149 |
| 3,495,216 | 2/1970 | Silverschotz | 340/149 |
| 3,500,336 | 3/1970 | Cuccio | 340/324.1 |

*Primary Examiner*—John W. Caldwell
*Assistant Examiner*—Howard S. Cohen
*Attorney*—Dressler, Goldsmith, Clement & Gordon

ABSTRACT: A method and system for entering data into a data-processing system and simultaneously verifying the data by displaying the original information or an image thereof, entering the original information into the system, and displaying the entered information in a format similar to the format of the original information and in juxtaposition therewith.

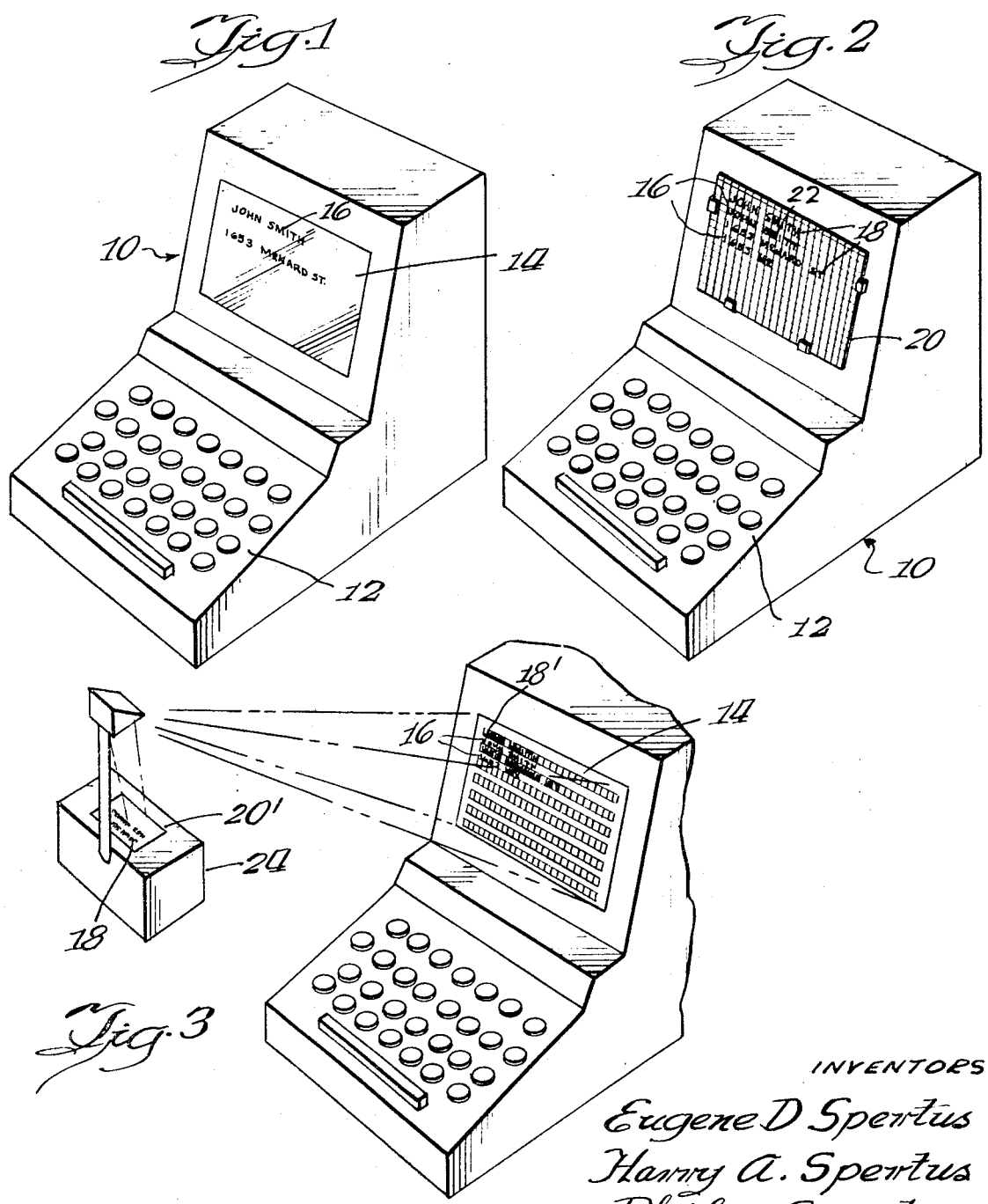

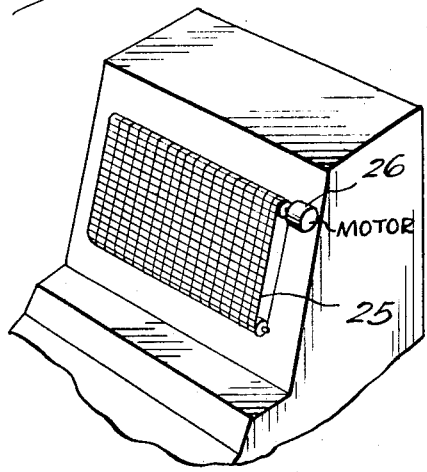
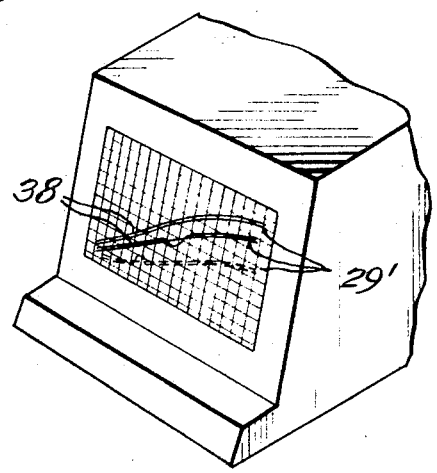
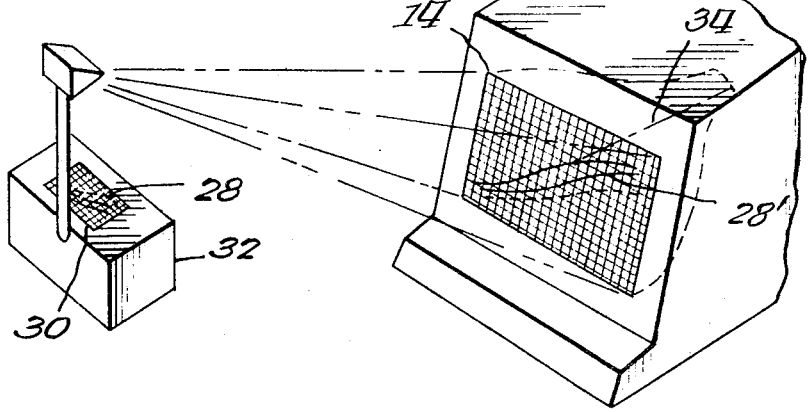
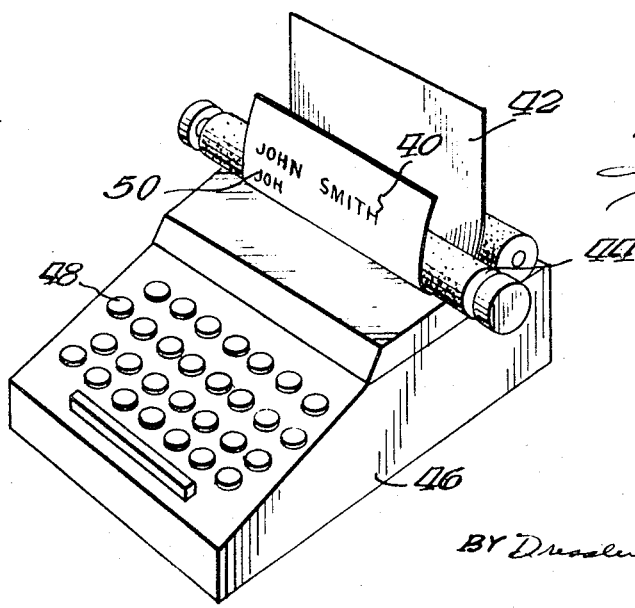

DATA VERIFICATION METHOD AND SYSTEM

BACKGROUND OF INVENTION

There exist various types of data input devices and procedures by which information can be entered into automatic data-processing systems, such as, for example, electronic digital computers. The information to be entered into such automatic data-processing systems can, of course, take many forms. In the entry of such information into an automatic data-processing system, no matter what form the original information is in, the data that is entered must be correct and free from errors if it is to be of any use.

One form of information that is entered into automatic data-processing systems is plain language data. Information in this form may be, for example, alphanumeric characters or graphic data which is to be converted into computer usable data.

Typically, alphanumeric information is entered into a data-processing system by use of a manually operated typewriter keyboard, the output of which is in the form of computer-coded representations of the alphanumeric data being entered. Typically, as such alphanumeric data are being entered into a data-processing system, a display device such as a cathode-ray tube is utilized to reproduce and display the data entered into the system.

Alternatively, plain language information, which may be alphanumeric or other graphic representations, may be entered into the data-processing system semiautomatically. One example of this procedure is to scan the information with a flying-spot scanner the output from which may also be converted into data processing form.

In either of these or other similar approaches, i.e., when plain language information is entered into a data-processing system by conversion into system usable data, it is highly desirable and often mandatory to verify the accuracy of the data that is being entered into the system. Typically, this verification has been accomplished by reproducing and displaying the entered data as indicated above, and by visually comparing the reproduced data with the original information, or by rekeying the original data.

This process, which is in the nature of proofreading, is subject to the same deficiencies that occur during usual proofreading operations. The deficiencies in verifying input data in this manner are even more pronounced since the presence of any error cannot be tolerated.

Furthermore, typical alphanumeric information entered into a data-processing system is in the form of computer code words, e.g., an arbitrary arrangement of symbols, which may be unintelligible to a person not having a complete understanding of the meaning of such code symbols.

These deficiencies are accentuated when it is realized that this verification process is usually effected by checking the reproduced data at one location, e.g., the display on the face of a cathode-ray tube, with the original information separately located, for example, on a data sheet from which the information has been copied into the data-processing system. Anyone who has attempted to proofread two documents, even when located side by side, can appreciate the difficulty of accurate error checking utilizing this procedure, particularly when attempted at relatively high speeds in order to effect rapid entry of the data into the data processing system.

SUMMARY

In accordance with the present invention there is provided a method and system for rapid and accurate verification of data being entered into a data-processing system accomplished by the reproduction and display of the entered data in a form compatible with the original information. The reproduced data is displayed in juxtaposition with the original information to enable rapid and accurate comparison therebetween. The juxtaposition of the reproduced data with the original information readily reveals errors occurring in the entered data by side by side comparison of the original and reproduced data since any differences between the reproduced data and the original information, i.e., errors, become readily apparent.

More specifically, the original information, which may be recorded on transparent data sheets, is superposed over a display screen on which the data being entered into the system is displayed. The resulting juxtaposition of the original information with the displayed data, either side by side or one over the other, readily reveals errors occuring in the data being entered.

The original data may take the form of discrete data cards which may be successively placed over the screen or may take the form of a continuously advancing data sheet. Alternatively, the original information may be projected onto the display screen from a remote location, a particularly useful procedure when the original information is recorded on opaque media.

The information can be entered into the data-processing system by use of a standard keyboard instrument or alternatively by using the display screen as an input device as well as a display device. In yet another embodiment, the data being entered can be reproduced as hard copy, e.g., on a suitable automatic printer, with the reproduced characters disposed immediately above or below the original information.

Thus, in accordance with the present invention there is provided a method and system for verification of data being entered into an automatic data-processing system. The method and system of the present invention not only effect desired accuracy of verification but permit this result to be accomplished at a rapid rate.

Numerous other advantages and features of the present invention will become readily apparent from the following detailed description of the invention and of one embodiment thereof, from the claims and from the accompanying drawings in which each and every detail shown is fully and completely disclosed as a part of this specification, in which like numerals refer to like parts.

FIG. 1 is a diagrammatic view of a typical existing input terminal;

FIG. 2 is a diagrammatic view of a data input terminal incorporating one embodiment of the present invention;

FIG. 3 is a diagrammatic view of an alternative embodiment;

FIG. 4 is a partial diagrammatic view of yet another embodiment;

FIG. 5 is a diagrammatic view of an embodiment for use in entry and verification of graphic information;

FIG. 6 is a diagrammatic view showing how errors in graphic information may be detected; and FIG. 7 is a diagrammatic view of still another alternative embodiment.

DETAILED DESCRIPTION

Referring now to the drawings there is shown in FIG. 1 an example of a typical existing data input terminal 10 for the entry of alphanumeric information into automatic data-processing systems. Such alphanumeric information usually is recorded on a coding form, which may be transparent or opaque, and which typically has a plurality of marked areas preprinted thereon within which the alphanumeric characters are to be written.

The data terminal 10 incorporates a typewriter keyboard 12 used for the entry of alphanumeric information into a data-processing system. The output of the keyboard 12 may take any number of forms of coded signals suitable for use by data-processing systems. Typically the output of the keyboard 12 is temporarily stored in a suitable buffer storage, such as a buffer register or magnetic tape, until the entered data is verified, after which it is entered into the data-processing system.

The data terminal 10 also includes a video display screen 14 on which the entered data may be reproduced and displayed, such as indicated at 16 in FIG. 1 The displayed data is utilized to determine whether errors have occurred during the process of entering the data into the system.

This type of "error checking" is not only slow but also inaccurate, particularly when such error checking is being attempted by a single operator. Under these circumstances, the accuracy of the data entered into the system is suspect since the continuous diverting of eyes from the displayed data to the original information not only increases the possibility of errors being inadvertently bypassed, but also limits the overall rate at which data may be processed through the data terminal 10.

The system of the present invention is shown in FIG. 2 in which the original information 18 may be recorded on a transparent data card 20, which is superposed over the video screen 14. In order to verify the accuracy of the entered data, it is displayed at 16 on the video screen 14 in juxtaposed relationship with the original information 18 on the data card 20.

Any errors, such as at 22, occurring in the displayed data 16 can readily be identified by side by side comparison of the components of the displayed data 16 and the original information 18, and the necessary corrections can be made. The juxtaposition of the displayed data 16 with the original information 18 reduces the time and increases the accuracy of verification with corresponding greater efficiency.

In FIG. 3 there is shown an alternative method and apparatus for superposing the original information on the display screen 14. In this embodiment, the original information 18 may be recorded on an opaque data card 20', which may be placed in a suitable projector 24 and projected onto the display screen 14 which may be slightly etched to receive the projected information 18'.

In yet another embodiment, as seen in FIG. 4, the data sheet may be in the form of a continuous roll 25 rather than in the form of discrete cards. The continuous data roll 25 can be advanced periodically, either manually or automatically such as by motor 26, to sequentially position the original information over the display screen.

As the data being entered is displayed on the screen, it should be appreciated that the relative positions of the original information and the displayed data can be adjusted to effect the desired juxtaposition. Thus, the original information and displayed data can be positioned adjacent to each other or superposed one on the other depending upon which position permits more efficient verification.

The present invention may also be used to verify nonalphanumeric information which is not readily entered by use of a keyboard-type data terminal. For example, such information can be entered directly through the display screen 14. Such operation can be effected by writing directly on the screen 14 with a suitable instrument such as a light pencil or by otherwise causing the information to appear on the screen. As seen in FIG. 5, original information 28, in graphic form, originally recorded on a data sheet 30 is inserted into a suitable projector 32 for projection, as at 28' onto the display screen of the data terminal. Alternatively, the data sheet may be superposed directly over the display screen 14.

Information appearing on the display screen 14 may be entered into the system by any suitable device, for example, by scanning the original information with a flying-spot scanner shown diagrammatically at 34. The information so entered into the data-processing system, can be reproduced on the screen in juxtaposition with the original information. In this manner, any errors that might have occurred during the data entry operation can be readily identified.

Thus, as seen in FIG. 6, errors 36 in the reproduced displayed graphic data 38 are readily detected by observation, since the original information 28' and reproduced data 38 fail to coincide throughout indicating the existence of an error. The erroneous data entered into the system can be erased and the original source material can be rescanned and reentered into the system.

It can be appreciated, that the present invention is not limited to a data terminal incorporating a display screen. Thus, as seen in FIG. 7, the original information 40 on a suitable data sheet 42 can be inserted into the carriage 44 of a printer data terminal 46 and the data entered by means of a keyboard 48. The entered data is produced at 50 by utilizing the data terminal 46 as a printer, the entered data being reproduced on the original data sheet 42 adjacent to the original information 40.

Thus, there has been disclosed a system and method for rapidly and accurately verifying the accuracy of data entered into a data-processing system by the reproduction of the entered data in juxtaposition with the original information. The juxtaposition of the original information with reproduced data facilitates comparison therebetween and rapid identification of any errors that may have occurred during the data entry operation.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. In a system for entering into an automatic data-processing system plain language information in the form of automatic data-processing data, a method of verifying the accuracy of the data being entered into said system comprising the steps of converting said entered data into the format of said original information and providing a reproduction thereof, and juxtaposing said reproduction and the original information whereby the accuracy of the entered data can be verified by a comparison therebetween.

2. The method of claim 13 including the steps of storing said data, displaying said stored data in its original form on a video screen, superposing the original information over the screen with each portion thereof juxtaposed relative to the corresponding portion of the displayed data, and visually comparing each portion of the reproduced data with the corresponding portion of the original information whereby the displayed data may be verified.

3. The method of claim 2 in which the original information is recorded on a transparent medium, and including the steps of superposing said medium over said screen whereby each portion of said data is displayed adjacent to the corresponding portion of the original information.

4. The method of claim 2 including the steps of projecting the original information onto said screen.

5. In a system for converting plain language information into data for use in automatic data-processing systems, a method of verifying the accuracy of said data comprising the steps of superposing the original information on a video screen, scanning said original information to enter data corresponding thereto into the system, reproducing from said data the original information in its original form and displaying said reproduced data on said screen superimposed with respect to the original information, whereby differences between the displayed data and the original information may be ascertained.

6. A method for verifying the accuracy of data entered into a data processing system including the steps of copying original plain language information and converting it into data for use in the data processing system, entering said converted data into the data processing system, operating on said data to display said data in its original form, juxtaposing the displayed data and the original information relative to each other, and the original information relative to each other, and visually comparing the displayed data and the original information to verify the accuracy of the data entered into said system.

7. A method of claim 6 in which the step of entering said data includes the step of temporarily storing said data, displaying said temporarily stored data, correcting any errors in the temporarily stored data, and entering the corrected temporarily stored data into the data processing system.

8. In a system for entering data into a data processing system by means of a data input terminal having a video display screen, a keyboard, and means for storing said data, means for superposing the original information over said screen and means for displaying said stored data on said screen in juxtaposition with said original information whereby the accuracy of said stored data can be verified by visual comparison between said displayed data and original information.

9. In a system as claimed in claim 8 wherein said original information is recorded on transparent data medium, means for supporting said transparent medium in superposed relationship over said display screen.

10. In a system as claimed in claim 9 means for successively superposing different portions of said transparent medium over said display screen.

11. In a system as claimed in claim 8, means scanning said superposed original information and storing data representative thereof, and means displaying said stored data on said display screen in superposition to said original information, whereby the accuracy of said stored data can be verified by comparison of said superposed displayed data and original information.

12. In a system as claimed in claim 8, wherein said means for superposing said original information over said display screen includes means for projecting said original information onto said display screen, whereby said data is displayed in juxtaposition with said projected original information.

13. A method for entering information into a data-processing system and simultaneously verifying the entered information comprising the steps of providing a display of the original information, entering the original information into the data processing system, and displaying the entered information in the same format as the original information and in superposition with the display of the original information, whereby the accuracy of the entered information can be verified by visual comparison of the respective displays.

* * * * *

UNITED STATES PATENT OFFICE
CERTIFICATE OF CORRECTION

Patent No. 3,631,396          Dated December 28, 1971

Inventor(s) Eugene D. Spertus, et al.

It is certified that error appears in the above-identified patent and that said Letters Patent are hereby corrected as shown below:

Column 4, line 1, "produced" should be --reproduced--.

line 30, "13" should be --1--.

line 64, "the original information relative to each other, and" should be deleted.

Signed and sealed this 11th day of July 1972.

(SEAL)
Attest:

EDWARD M. FLETCHER, JR.           ROBERT GOTTSCHALK
Attesting Officer                  Commissioner of Patents